US012756262B2

(12) United States Patent
Kneissl

(10) Patent No.: US 12,756,262 B2
(45) Date of Patent: Oct. 6, 2026

(54) PRESSURE EQUALIZATION DEVICE FOR AN ELECTRIC MACHINE, HOUSING, ELECTRIC MACHINE AND MOTOR VEHICLE

(71) Applicant: Bayerische Motoren Werke Aktiengesellschaft, Munich (DE)

(72) Inventor: Sebastian Kneissl, Aichach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 214 days.

(21) Appl. No.: 18/703,588

(22) PCT Filed: Jan. 11, 2023

(86) PCT No.: PCT/EP2023/050513
§ 371 (c)(1),
(2) Date: Apr. 22, 2024

(87) PCT Pub. No.: WO2023/151883
PCT Pub. Date: Aug. 17, 2023

(65) Prior Publication Data

US 2025/0239906 A1 Jul. 24, 2025

(30) Foreign Application Priority Data

Feb. 8, 2022 (DE) ..................... 10 2022 102 858.5

(51) Int. Cl.
*H02K 5/20* (2006.01)
*H02K 9/197* (2006.01)

(52) U.S. Cl.
CPC ............... *H02K 5/20* (2013.01); *H02K 9/197* (2013.01); *H02K 2205/09* (2013.01)

(58) Field of Classification Search
CPC ............ H02K 5/04; H02K 9/197; H02K 5/20; H02K 5/124; H02K 2205/09; H02K 2213/03
(Continued)

(56) References Cited

U.S. PATENT DOCUMENTS 3,318,253 A * 5/1967 Campolong ........ F04D 29/5806 165/104.31
4,341,093 A * 7/1982 Oishi ..................... H02K 9/193 62/505
(Continued)

FOREIGN PATENT DOCUMENTS

DE 10 2013 200 894 A1 7/2014
DE 10 2013 212 932 A1 1/2015
(Continued)

OTHER PUBLICATIONS

International Search Report (PCT/ISA/210) issued in PCT Application No. PCT/EP2023/050513 dated Apr. 13, 2023 with English translation (6 pages).
(Continued)

*Primary Examiner* — Alex W Mok
(74) *Attorney, Agent, or Firm* — Crowell & Moring LLP

(57) ABSTRACT

A pressure equalization device has three backflow preventers, in particular check valves, wherein an outflow side of the first backflow preventer is fluidically connected to an inflow side of the second backflow preventer and is also designed to be fluidically connected to an air chamber of the casing. An outflow side of the second backflow preventer is connected to an inflow side of the third backflow preventer and is also designed to be fluidically connected to a fluid chamber of the casing. The chambers are fluidically sealed off from each other by means of a radial shaft seal.

12 Claims, 1 Drawing Sheet

(58) Field of Classification Search
USPC .......................................................... 310/89
See application file for complete search history.

(56) References Cited

U.S. PATENT DOCUMENTS

| | | | | |
|---|---|---|---|---|
| 4,358,937 | A * | 11/1982 | Okamoto | H02K 9/193 62/505 |
| 4,364,241 | A * | 12/1982 | Okamoto | H02K 9/193 62/505 |
| 4,368,895 | A * | 1/1983 | Okamoto | F16J 15/406 277/412 |
| 4,614,482 | A | 9/1986 | Gaffal | |
| 5,796,197 | A | 8/1998 | Bookout | |
| 6,135,721 | A * | 10/2000 | Hasbrouck | F04F 1/10 417/120 |
| 6,224,344 | B1 * | 5/2001 | Hasbrouck | F04F 1/02 417/120 |
| 7,107,767 | B2 | 9/2006 | Frazer et al. | |
| 7,607,319 | B2 * | 10/2009 | Okamoto | F04C 29/126 62/527 |
| 2004/0103656 | A1 | 6/2004 | Frazer et al. | |
| 2008/0282716 | A1 | 11/2008 | Parsch et al. | |
| 2008/0307797 | A1 * | 12/2008 | Okamoto | F04C 29/126 91/499 |
| 2010/0202902 | A1 * | 8/2010 | Kuwabara | F04B 1/1072 417/559 |
| 2012/0049666 | A1 * | 3/2012 | Garriga | H02K 9/12 310/54 |
| 2015/0030491 | A1 * | 1/2015 | Desiron | F04C 29/021 418/205 |
| 2016/0146352 | A1 * | 5/2016 | Juchymenko | F01C 21/04 277/432 |
| 2017/0346359 | A1 | 11/2017 | Tachikawa | |
| 2018/0269743 | A1 * | 9/2018 | Büttner | F16J 15/3404 |
| 2020/0096022 | A1 | 3/2020 | Kutre | |

FOREIGN PATENT DOCUMENTS

| | | | |
|---|---|---|---|
| DE | 10 2017 109 253 | A1 | 10/2018 |
| DE | 10 2017 128 532 | B4 | 10/2019 |
| EP | 2 321 556 | B1 | 4/2014 |
| EP | 2 924 231 | A1 | 9/2015 |
| GB | 2 078 878 | A | 1/1982 |
| KR | 10-2008-0066963 | A | 7/2008 |
| WO | WO 2010/028753 | A1 | 3/2010 |

OTHER PUBLICATIONS

German-language Written Opinion (PCT/ISA/237) issued in PCT Application No. PCT/EP2023/050513 dated Apr. 13, 2023 with English translation (10 pages).

German-language Search Report issued in German Application No. 10 2022 102 858.5 dated Dec. 5, 2022 with partial English translation (11 pages).

Korean-language Notice of Allowance issued in Korean Application No. 10-2024-7018819 dated Jan. 2, 2026, with English translation (3 pages).

* cited by examiner

PRESSURE EQUALIZATION DEVICE FOR AN ELECTRIC MACHINE, HOUSING, ELECTRIC MACHINE AND MOTOR VEHICLE

BACKGROUND AND SUMMARY

The present invention relates to a pressure equalization device for an electric machine. The invention also relates to a housing for an electric machine, the housing having the pressure equalization device. Additionally proposed according to the invention is an electric machine with such a housing. Moreover, the invention relates to a motor vehicle, designed in particular as a passenger car, which has such an electric machine.

In the case of electrical assemblies, for example electrical drive units, which have an electric machine (for example as a traction machine), it often happens that a liquid-filled liquid chamber of the electrical assembly is fluidically sealed off from an air chamber even though a machine element, for instance a shaft etc., extends from an interior of the liquid chamber into the air chamber. For example, a rotor shaft extends out of a liquid-filled stator chamber (liquid chamber) into an air-filled brush chamber (air chamber) of the electric machine, the stator chamber and the brush chamber being fluidically sealed off from one another along the rotor shaft. This means that an electric machine of such a design is then a so-called wet rotor machine. Similarly, the rotor shaft in dry-running electric machines may extend out of the air-filled stator chamber (air space) into an oil-filled transmission chamber (liquid chamber), the stator chamber and the transmission chamber then being fluidically sealed off from one another along the rotor shaft.

In order to avoid liquid undesirably escaping from the liquid chamber and entering the air chamber, a radial shaft seal is used along the rotor shaft on a wall element which is between the liquid chamber and the air chamber and through which the rotor shaft extends. In order to keep this radial shaft seal as free from axial forces as possible, so that a particularly reliable sealing effect is ensured by the radial shaft seal, it is required not to allow an overpressure or underpressure which acts axially, that is to say along the rotor shaft, on the radial shaft seal in a disadvantageous way to occur in the corresponding chamber, that is to say for example in the liquid chamber, with respect to the air chamber. If a motor vehicle is equipped with such a conventional drive unit or with such a conventional electrical assembly or electric machine, it may happen for example that air in the air chamber is heated or cooled, for instance as a result of waste heat occurring during operation of the electric machine or as a result of external cooling of the electric machine, for example due to operating in fording mode. According to the laws of thermodynamics, this results in a change in pressure in the air chamber and consequently a pressure difference between the air chamber and the liquid chamber. This is accompanied by undesired axial loading of the radial shaft seal and ultimately a reduced or less reliable sealing effect for the shaft seat between the chambers.

To overcome this problem, DE 10 2013 200 894 A1 for example discloses a housing of a generator that has a plug socket and a pressure equalizing channel. The pressure equalizing channel connects an interior space of the generator to a wiring harness which is inserted into the plug socket and also serves for equalizing the pressure, with respect to the outside. However, combining the plug socket with the pressure equalizing channel involves particularly great effort and a sealing effect is dependent on a correct fit of a plug element in the plug socket. Moreover, such a generator housing with the plug socket and also the wiring harness are not easy to handle for production-vehicle construction, are expensive and require a particularly great amount of installation space outside the generator, whereby an ever-present packaging issue in vehicle construction is further exacerbated.

DE 10 2017 128 532 B4 discloses a cable with an electrical conductor which is encapsulated in an insulating material of the cable and is surrounded by an electrically insulating and vapor-impermeable outer sheath of the cable. Arranged at one point of the cable is a semipermeable membrane, which is permeable to air and water vapor, the outer sheath having clearances in the region of the membrane, so that venting of the cable is ensured by way of the membrane. Such a conventional cable however involves particularly great effort with regard to production, operation and handling, since the semipermeable membrane can be damaged particularly easily, so that liquid can come into direct electrical contact with the electrical conductor through the defective/damaged membrane. This would result in a short circuit.

In the case of conventional electric machines or conventional housings, radial shaft seals may enter into critical operating states in which a sealing effect of the radial shaft seal is diminished as a result of a pressure difference between the air chamber and the liquid chamber, in particular between the stator chamber and the brush chamber. Depending on a current operating temperature of the radial shaft seal, even a particularly small pressure difference is sufficient for such a critical operating state. If the sealing effect diminishes as a result of the pressure difference, a leakage flow of a liquid in the liquid chamber (for example a wet rotor liquid for cooling the stator and/or rotor in the stator chamber) may occur by way of the no longer sufficiently sealing radial shaft seal out of the liquid chamber into the air chamber. There, the machine may suffer damage and/or a malfunction, for instance a so-called insulation fault.

An object of the invention is to provide a particularly efficient solution to avoid a pressure difference between a liquid chamber and an air chamber of an electric machine which are fluidically sealed off from one another by a radial shaft seal.

This object is achieved by the subjects of the present disclosure. Features, advantages and possible configurations that are presented in the course of the description for one of the subjects of the independent claims should be regarded at least analogously as features, advantages and possible configurations of the respective subject of the other independent claims and any possible combination of the subjects of the independent claims. Further possible configurations of the invention are disclosed in the subclaims, the description and the figures.

In order to avoid, in particular completely avoid, an undesirably strong pressure difference between a liquid chamber and an air chamber of a housing or of an electric machine, according to a first aspect of the invention a pressure equalization device for an electric machine having a housing is proposed. In the installed position as intended, that is to say when the pressure equalization device has been fitted or inserted according to its designated intended use, it forms part of the housing. Consequently, the electric machine having the housing has the pressure equalization device, in that the housing has the pressure equalization device as a component part. As a consequence, the motor vehicle has the pressure equalization device, in that it has the electric machine and as a consequence the housing.

In the case of the electric machine, a shaft, in particular rotor shaft, extends out of the liquid-filled liquid chamber into the air chamber. The air chamber is free from a liquid and in particular is filled with air (for example from the atmosphere). In order to prevent flowing of the liquid out of the liquid chamber and into the air chamber—in particular along the rotor shaft—the housing or the electric machine has a radial shaft seal, which encloses the rotor shaft fluidically seal-tightly on the outer circumferential side at the point at which the rotor shaft penetrates a wall separating the air chamber and the liquid chamber from one another. The radial shaft seal itself is at this point enclosed fluidically seal-tightly on the outer circumferential side by the wall.

The pressure equalization device comprises three backflow preventers, the respective backflow preventer having an inflow side and an outflow side. The respective backflow preventer can be flowed through by a fluid (for example air) from its inflow side in the direction of its outflow side. By contrast, by the respective backflow preventer, flowing through of the same from its outflow side in the direction of its inflow side is stopped or blocked. During operation as intended of the respective backflow preventer, the fluid can therefore only flow through the backflow preventer if it flows into it by way of its inflow side and flows out of it by way of the outflow side. The fluid cannot flow into the backflow preventer by way of the outflow side. Consequently, the respective backflow preventer is a check valve that only allows the flowing of a fluid (liquid, gas) in one direction.

The outflow side of the first backflow preventer, which is referred to hereinafter as the "first outflow side", is fluidically connected to the inflow side of the second backflow preventer ("second inflow side"). Moreover, the first outflow side is designed to be fluidically connected to the air chamber of the housing. Consequently, for the installed position as intended, it is the case that the first outflow side is fluidically connected—directly or indirectly, for example by a channel element—to the air chamber. At the same time, the first outflow side and the second inflow side communicate fluidically with one another, whereby, in the installed position as intended, the second inflow side and the air chamber are likewise fluidically coupled to one another. The first inflow side, that is to say the inflow side of the first backflow preventer, opens out into the surrounding region of the pressure equalization device or of the electric machine, for instance into the atmosphere.

The outflow side of the second backflow preventer ("second outflow side") is connected to the inflow side of the third backflow preventer ("third inflow side"). Moreover, the second outflow side is designed to be fluidically connected to the liquid chamber of the housing. Consequently, for the installed position as intended, it is the case that the second outflow side is fluidically connected—directly or indirectly, for example by a further channel element—to the liquid chamber. At the same time, the second outflow side and the third inflow side communicate fluidically with one another, whereby, in the installed position as intended, the third inflow side and the liquid chamber are likewise fluidically coupled to one another. The third outflow side opens out into the surrounding region of the pressure equalization device or of the electric machine, that is to say for example into the atmosphere.

Therefore, in the installed position as intended, it is possible as a result of the backflow preventers predetermining the respective flow direction for a fluid, for instance air,

- to flow out of the surrounding region through the first backflow preventer and into the air chamber,
- to flow out of the surrounding region through the first backflow preventer, through the second backflow preventer and into the liquid chamber,
- to flow out of the air chamber, through the second backflow preventer and through the third backflow preventer into the surrounding region,
- to flow out of the air chamber, through the second backflow preventer and into the liquid chamber, to flow out of the liquid chamber and through the third backflow preventer into the surrounding region.

At the same time, in the installed position as intended, as a result of the backflow preventers predetermining the respective flow direction, the fluid is prevented from being able

- to flow out of the air chamber and through the first backflow preventer into the surrounding region,
- to flow out of the liquid chamber and through the second backflow preventer into the surrounding region or into the air chamber.

This ensures that the radial shaft seal of the electric machine fluidically seals off the air chamber and the liquid chamber from one another particularly reliably, since the critical operating states of the radial shaft seal described at the beginning are prevented by the pressure equalization device. As a result of the absence of a pressure difference, the radial shaft seal is not subjected to any axial deformations during operation of the electric machine, or is only subjected to particularly minor axial deformations, resulting in particularly little friction between the rotor shaft rotating during operation and the radial shaft seal. Therefore, particularly great efficiency is made possible by the electric machine that has the pressure equalization device. Furthermore, as a result of the pressure equalization device, the electric machine has an advantageously particularly long lifetime and/or particularly long servicing intervals, since the less-stressed radial shaft seal as a result of the pressure equalization device has a longer lifetime and needs less servicing.

The air chamber of the electric machine or of the housing may be for example a brush chamber, with the liquid chamber then being a stator chamber. The rotor shaft in this case extends both in the brush chamber and in the stator chamber. By the radial shaft seal in conjunction with the rotor shaft enclosed by the radial shaft seal, the brush chamber and the stator chamber are fluidically sealed off from one another. At the same time it is the case for the installed position as intended that the first outflow side and the second inflow side are fluidically connected to the brush chamber, the second outflow side and the third inflow side being fluidically connected to the stator chamber.

Furthermore, the liquid chamber may be formed by a combined chamber unit comprising the stator chamber and a transmission chamber fluidically connected to it, the rotor shaft on the one hand extending in the brush chamber and on the other hand extending in the combined chamber unit, in that the rotor shaft passes through the stator chamber and in particular protrudes into the transmission chamber. By the rotor shaft seal in conjunction with the rotor shaft enclosed by the radial shaft seal, the brush chamber and the stator chamber—and as a consequence the combined chamber unit—are fluidically sealed off from one another. In the installed position as intended, the first outflow side and the second inflow side are fluidically connected to the brush chamber, the second outflow side and the third inflow side being fluidically coupled to the combined chamber unit forming the liquid chamber. For example, the second outflow side and the third inflow side are fluidically connected to the stator chamber and/or to the transmission chamber.

Furthermore, the stator chamber may be formed by the air chamber, with the liquid chamber in this case being formed by the transmission chamber. The rotor shaft in this case extends both in the stator chamber and in the transmission chamber, which are fluidically sealed off from one another by the radial shaft seal in conjunction with the rotor shaft enclosed by the radial shaft seal. In this case, in the installed position as intended, the first outflow side and the second inflow side are fluidically connected to the stator chamber, the second outflow side and the third inflow side being fluidically connected to the transmission chamber. For the case where the stator chamber and the brush chamber communicate fluidically with one another, the air chamber may be formed by another combined chamber unit, which has the stator chamber and the brush chamber fluidically connected to it. Then, the first outflow side and the second inflow side can be fluidically connected to the brush chamber and/or to the stator chamber. The other combined chamber unit, and consequently the air chamber, may also comprise an inverter chamber, which communicates fluidically with the stator chamber and/or the brush chamber. Then, the first outflow side and the second inflow side can be fluidically connected to the stator chamber and/or to the brush chamber and/or to the inverter chamber. Alternatively, the inverter chamber is fluidically sealed off the stator chamber and/or the brush chamber. In this case, air is extracted from the inverter chamber by a separate pressure equalization element or the inverter chamber is fluidically connected to the first outflow side and the second inflow side.

In a further configuration of the pressure equalization device, the second backflow preventer is designed to allow the flowing of the fluid or the air from its (second) inflow side to its (second) outflow side as from an opening pressure difference existing between the second inflow side and the second outflow side which is smaller than a pressure difference between the liquid chamber and the air chamber that would lead to a critical operating pressure described at the beginning. Accordingly, in this configuration it is provided that the opening pressure difference below which the flowing of the air between the second inflow side and the second outflow side is allowed by the second backflow preventer is less than 10 mbar (millibars), in particular less than 5 mbar, preferably less than 1 mbar. In this way, even particularly small pressure differences between the liquid chamber and the brush chamber air chamber are advantageously avoidable.

Depending on the installation space available, the backflow preventers may be arranged in any way desired in the surrounding region of the housing—in particular separately and/or spatially away from one another—and, as and when required, fluidically connected to one another and also to the air chamber and the liquid chamber by a channel system, pipe system, hose system etc. in a way corresponding to the arrangement described herein. In order to deal efficiently with a currently particularly tricky packaging issue, that is to say to utilize efficiently the little available installation space in the production and/or design of motor vehicles, in a further configuration it is provided that at least two of the backflow preventers or all of the backflow preventers are formed together in one structural unit. This dispenses with part of the channel system, at least those channel elements that connect between the backflow preventers to one another. Apart from the packaging advantage, this also has the advantage that the pressure equalization device is of a particularly lightweight design, whereby ultimately a motor vehicle that can be operated particularly efficiently in terms of energy and with low emissions is obtained.

In a further possible embodiment, the pressure equalization device has a filter element which can be flowed through by a fluid and the first throughflow side of which is fluidically connected to the inflow side of the second backflow preventer. Moreover, the second throughflow side of the filter element is designed to be fluidically connected to the air chamber, in particular the brush chamber, of the housing, so that, for the installed position as intended, it is the case that the second throughflow side and the air chamber or brush chamber are fluidically connected to one another. As a result of the rotor shaft rubbing against the brushes (sliding contacts), dust, in particular of metal, occurs in the brush chamber during the operation of the electric machine. Therefore, it may happen that the air which flows out of the air chamber forming the brush chamber is laden with the metal dust and, as a result, transports the metal dust out of the brush chamber. The dust-laden air flowing out of the air chamber is filtered by the filter element, whereby dust-free air can flow further in the direction of the second backflow preventer. This prevents the metallic dust particles from undesirably passing the second backflow preventer and in particular getting into the liquid chamber, in particular the stator chamber. This is so because an electrically conducting or conductive short circuit between the rotor and the stator and/or between terminal contacts (usually referred to as U, V, W) has to be avoided for satisfactory functioning. Furthermore—if the second outflow side and the transmission chamber are connected to one another—it is avoided that the metallic dust particles get into the transmission chamber. This applies analogously if the stator chamber and the transmission chamber are fluidically grouped together to form the combined chamber unit. Specifically, the metal dust particles would undesirably increase friction between transmission elements in the transmission chamber and/or damage the transmission elements, for example bearings etc. This could ultimately lead to transmission damage and consequently to a drive failure of the motor vehicle equipped with the electric machine.

The first throughflow side of the filter element and the first outflow side of the first backflow preventer are in particular fluidically connected to one another—as provided in a further configuration. In this case, the filter element has a dual functionality; specifically, firstly it is used to filter the brush dust out of the air which flows out of the brush chamber and secondly it is used to filter dust or the like out of the air which flows out of the surrounding region in the direction of the air chamber or brush chamber. Further installation locations for the filter element and/or at least one further filter element are conceivable, for instance to avoid dust etc. from the surrounding region getting into the liquid chamber or into the housing of the electric machine at all. For this purpose, for example a further filter element may be arranged upstream of the first inflow side of the first backflow preventer.

In a further configuration of the pressure equalization device, at least one or more of the backflow preventers is/are designed as a check valve, in particular an umbrella valve. It may be provided that all of the backflow preventers used in the pressure equalization device are designed as a respective check valve. Generally, other embodiments are also conceivable for one or more of the backflow preventers, for example a check flap, a plate check valve, a ball check valve, etc. Moreover, it is conceivable that one or more of the backflow preventers is designed as a stop valve that can be controlled (in particular electronically) as and when required.

The configuration of one or more of the backflow preventers as a check valve is advantageous to the extent that the pressure equalization device can be produced particularly easily, with the check valve providing a particularly reliable sealing function. Furthermore, nowadays check valves can be produced and fitted particularly efficiently in terms of installation space, whereby the idea of particularly advantageous packaging is especially taken into account. Moreover, umbrella valves are particularly low-maintenance, which contributes to an advantageously particularly long lifetime of the pressure equalization device.

In a further aspect of the invention, a housing for an electric machine is proposed, the housing having a pressure equalization device designed according to the description above. The housing therefore has the liquid chamber and the air chamber or is at least partially formed by the liquid chamber and the air chamber. At the same time, the liquid chamber and the air chamber can be fluidically connected to one another by way of the pressure equalization device in such a way that air (or some other fluid) can flow out of the air chamber into the liquid chamber, but not out of the liquid chamber into the air chamber. Furthermore, the housing has an opening which fluidically connects the liquid chamber and the air chamber to one another and is designed to serve as a seat for the radial shaft seal. In the case of the electric machine, the rotor shaft extends out of the liquid chamber into the air chamber through this opening, that is to say for example out of the stator chamber into the brush chamber and/or out of the stator chamber into the transmission chamber. In the installed position as intended (that is to say when a component part of the ready-to-use electric machine is formed by the housing), the air chamber and the liquid chamber are fluidically sealed off from one another, in that the radial shaft seal has been inserted into the opening, with a shaft, in particular a rotor shaft, of the electric machine extending through the radial shaft seal.

In a possible development of the housing, a brush chamber of the housing is formed by the air chamber, with a stator chamber of the housing being formed by the liquid chamber. Alternatively, it may be provided for the housing that the air chamber is formed by a combined chamber unit which is formed by the brush chamber and the stator chamber communicating fluidically with it, with a transmission chamber of the housing being formed by the liquid chamber. In the case of a further possibility for configuring the housing, the brush chamber of the housing is formed by the air chamber, with the liquid chamber being formed by another combined chamber unit, which is formed by the stator chamber and the transmission chamber communicating fluidically with it.

In a further aspect, the invention relates to an electric machine which comprises the housing according to the description above, having the pressure equalization device. The electric machine is designed in particular as an electric traction machine for a motor vehicle.

Moreover, in a further aspect, the invention relates to a motor vehicle, in particular a passenger car and/or a truck, the motor vehicle having the electric machine designed according to the description above. Accordingly, the motor vehicle is in particular an at least partially electrically drivable/movable motor vehicle or a purely electrically operable motor vehicle.

Further features of the invention may emerge from the claims, the figures and the description of the figures. The features and combinations of features mentioned above in the description and the features and combinations of features shown in the description of the figures below and/or in the figures alone can be used not only in the respectively stated combination but also in other combinations or alone without departing from the scope of the invention.

DETAILED DESCRIPTION OF THE DRAWINGS

In the figures, elements that are the same or functionally the same are provided with the same designations. The following submission relates equally to a pressure equalization device DAV, a housing G, an electric machine EM and a motor vehicle (not shown).

Figure 1:
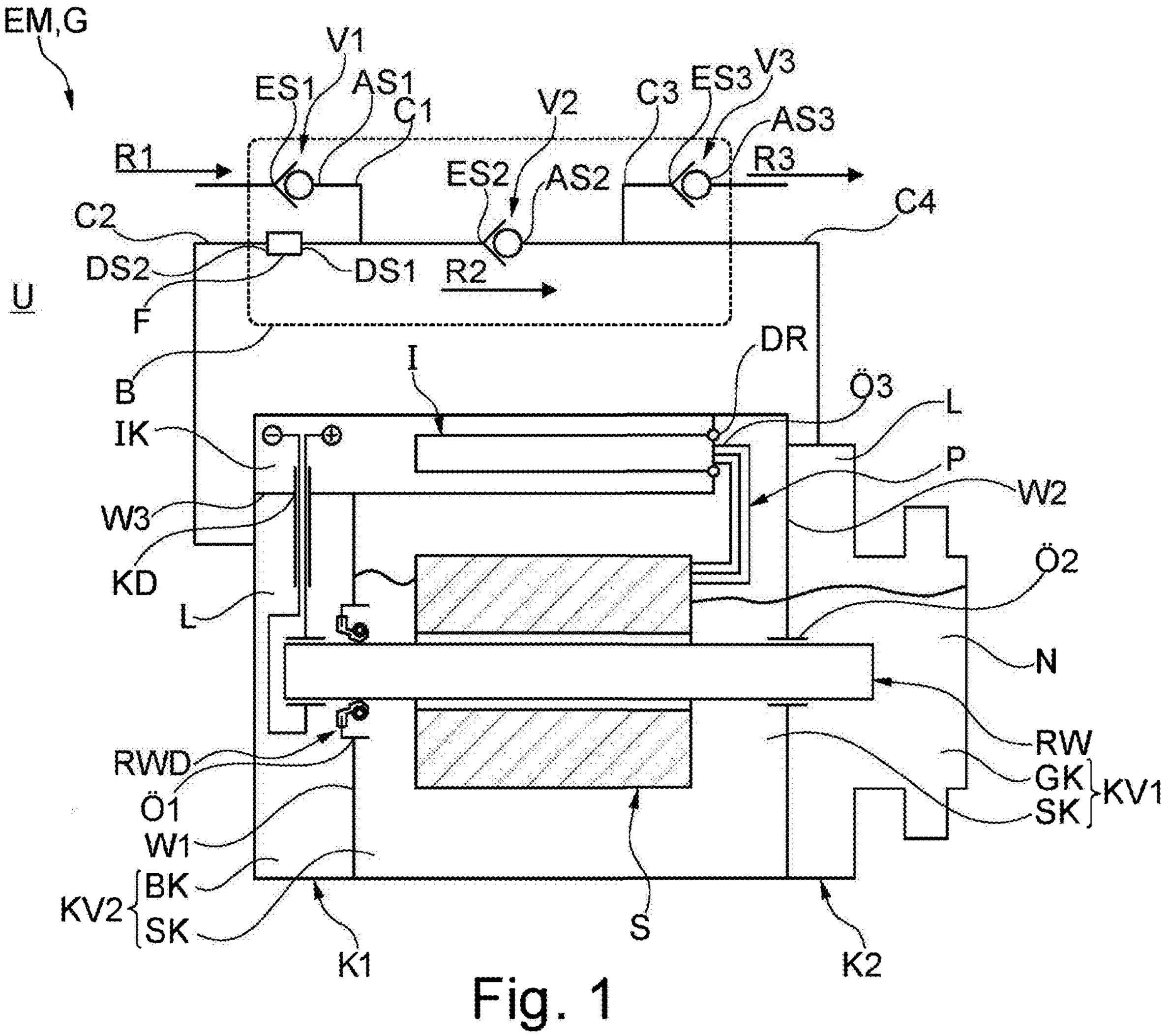
FIG. 1 shows a schematic view of an electric machine, having a housing, with a pressure equalization device.

For this purpose, FIG. 1 shows in a schematic view the electric machine EM, having the housing G, with the pressure equalization device DAV, which has the backflow preventers V1, V2, V3. In the present case, the respective backflow preventer V1, V2, V3 is formed as a respective check valve, in particular in each case in the form of an umbrella valve. A first outflow side AS1 of the first backflow preventer V1 and a second inflow side ES2 of the second backflow preventer V2 are fluidically connected to one another, in the present case in that a channel element C1 opens out into a channel element C2, by which the first outflow side AS1 and an air chamber K1 of the housing G or of the electric machine (EM) are fluidically connected to one another. A second outflow side AS2 of the second backflow preventer V2 and an inflow side ES3 of the third backflow preventer V3 are fluidically connected to one another, in the present case in that a channel element C3 opens out into a channel element C4, by which the second outflow side AS2 and a liquid chamber K2 of the housing G or of the electric machine (EM) are fluidically connected to one another.

The liquid chamber K2 is at least partially filled with a liquid N—for example a wet rotor liquid, a lubricant, for instance an oil, etc. The air chamber K1 is free from a liquid and is filled with air L. The air chamber K1 has a brush chamber BK of the housing G or of the electric machine EM or is formed by the brush chamber BK. The liquid chamber K2 has a stator chamber SK of the housing G or of the electric machine EM or is formed by the stator chamber SK. Consequently, the electric machine EM shown in FIG. 1 is a wet rotor machine. The housing G has in the present case a transmission chamber GK, which is filled for example with a transmission oil, in which transmission elements (not shown) swash during operation of the electric machine EM. At the same time, the transmission chamber GK and the stator chamber SK can communicate fluidically with one another, it being possible for the transmission oil to be the wet rotor liquid N or vice versa. Accordingly, the liquid chamber K2 may be formed by a first combined chamber unit KV1, which comprises the stator chamber SK and the transmission chamber GK.

Not shown, but similarly included in the present disclosure, is the possibility of designing the electric machine EM as a dry rotor machine, with the stator chamber SK then running in a dry state during operation of the electric machine EM, that is to say free from a liquid. In this case, the liquid chamber K2 is formed by the transmission chamber GK, with the air chamber K1 being formed by a second combined chamber unit KV2, which comprises the (dry, that is to say liquid-free) stator chamber SK and the brush chamber BK, which communicate fluidically with one another.

In order to avoid the liquid N leaking out of the liquid chamber K2 into the air chamber K1 along a rotor shaft RW extending out of the liquid chamber K2 and into the air chamber K1, the rotor shaft RW is enclosed fluid-tightly on the outer circumferential side by a radial shaft seal RWD. The radial shaft seal RWD sits for example in an opening Ö1 of a wall W1 of the housing G, the brush chamber BK and the stator chamber SK being fluidically sealed off from one another by the wall W1. In other words, the opening Ö1 penetrates the wall W1 and consequently connects the brush chamber BK and the stator chamber SK. A transfer of the liquid N is prevented however, in that the radial shaft seal RWD, which encloses the rotor shaft RW fluid-tightly on the outer circumferential side at the point of the opening Ö1, and the radial shaft seal RWD itself sits fluid-tightly in the opening Ö1.

Alternatively—if the stator chamber SK is part of the air chamber K1—the radial shaft seal RWD may sit in an opening Ö2 of a wall W2 of the housing G. By the wall W2, the stator chamber SK and the transmission chamber GK are fluidically sealed off from one another. In other words, the opening Ö2 penetrates the wall W2 and consequently connects the stator chamber SK and the transmission chamber GK. A transfer of the liquid N is prevented however, in that the radial shaft seal RWD, which encloses the rotor shaft RW fluid-tightly on the outer circumferential side at the point of the opening Ö2, and the radial shaft seal RWD itself sits fluid-tightly in the opening Ö2.

The channel elements C1, C2, C3, C4 can be flowed through by a fluid (that is to say for example by the air L or by the liquid N or any other desired fluid) bidirectionally, whereas the respective backflow preventer or the respective check valve V1, V2, V3 can only be flowed through by a fluid monodirectionally during use as intended, as shown in FIG. 1 by the possible flow directions R1, R2, R3. Consequently, supplying air to and extracting air from the chambers K1, K2 and also equalizing pressure between the chambers K1, K2 are possible, in that, as a result of the backflow preventers V1, V2, V3 predetermining the respective flow direction R1, R2, R3, the air L can flow in the following way

- out of a surrounding region U of the housing G or of the electric machine EM through the first backflow preventer V1 and into the air chamber K1,
- out of the surrounding region U through the first backflow preventer V1, through the second backflow preventer V2 and into the liquid chamber K2,
- out of the air chamber K1, through the second backflow preventer V2 and through the third backflow preventer V3 into the surrounding region U,
- out of the air chamber K1, through the second backflow preventer V2 and into the liquid chamber K2,
- out of the liquid chamber K2 and through the third backflow preventer V3 into the surrounding region U.

At the same time, the air L is prevented from being able

- to flow out of the air chamber K1 and through the first backflow preventer V1 into the surrounding region U,
- to flow out of the liquid chamber K2 and through the second backflow preventer V2 into the surrounding region U or into the air chamber K1.

Also indicated in FIG. 1 is an inverter chamber IK, with the brush chamber BK and the inverter chamber IK being fluidically connected to one another, in the present case by way of a cable leadthrough KD, by which an electric cable running in the brush chamber BK and in the inverter chamber IK (for instance an SSM cable) is led through a wall W3 of the housing G. Alternatively, in this case the brush chamber BK and the inverter chamber IK may be fluidically sealed off from one another, in that the cable leadthrough KD and the cable are designed such that a fluid transfer between the brush chamber BK and the inverter chamber IK is prevented. The stator chamber SK and the transmission chamber are in the present case fluidically connected to one another, with the third inflow side ES3 and the second outflow side AS2 being fluidically connected to the transmission chamber GK—as shown in FIG. 1. The rotor shaft RW extends out of the stator chamber SK into the transmission chamber GK through an opening Ö2 penetrating the wall W2. The inverter chamber IK and the stator chamber SK or transmission chamber GK are fluidically sealed off from one another, while between the inverter chamber IK and the stator chamber SK there may be formed an opening Ö3, through which terminal cables P run, connected on the one hand to a stator S and on the other hand to an inverter I of the electric machine EM. In order to ensure the fluid-tight separation between the stator chamber SK and the inverter chamber IK at the opening Ö3—if the electric machine EM is designed as the wet rotor machine and consequently the stator chamber SK is part of the liquid chamber K2—a sealing ring DR, for example in the form of an O-ring, is arranged there. If, by contrast, the stator chamber SK is part of the air chamber K1, the sealing ring DR may be omitted.

If a portion of the liquid chamber K2 is formed by the stator chamber SK, the first outflow side AS1 and the second inflow side ES2 are fluidically connected to one another and fluidically connected to the air chamber K1, in that they are fluidically connected to the brush chamber BK and/or to the inverter chamber IK. For this purpose, for example the channel element C2 may open out directly into the brush chamber BK and/or directly into the inverter chamber IK. In this case, the second outflow side AS2 and the third inflow side ES3 are fluidically connected to one another and fluidically connected to the liquid chamber K2, in that they are fluidically connected to the stator chamber SK and/or to the transmission chamber GK. For this, the channel element C4 may open out directly into the stator chamber SK and/or directly into the transmission chamber GK.

If a portion of the air chamber K1 is formed by the stator chamber SK, the first outflow side AS1 and the second inflow side ES2 are fluidically connected to one another and fluidically connected to the air chamber K1, in that they are fluidically connected to the brush chamber BK and/or to the stator chamber SK and/or to the inverter chamber IK. For this purpose, for example the channel element C2 may open out directly into the brush chamber BK and/or directly into the stator chamber SK and/or directly into the inverter chamber IK. In this case, the second outflow side AS2 and the third inflow side ES3 are fluidically connected to one another and fluidically connected to the liquid chamber K2, in that they are fluidically connected to the transmission chamber GK. For this, the channel element C4 may open out directly into the transmission chamber GK.

At least the second backflow preventer V2 is configured, selected or produced in such a way that it allows flowing of the air L as soon as a fluid pressure or air pressure present on the second inflow side ES2 reaches or exceeds 1 mbar.

As also revealed by FIG. 1, the backflow preventers V1, V2, V3 are in the present case formed in structural unit B, that is to say are grouped together to form the structural unit B. At the same time, the channel elements C1, C3 can be made particularly short or omitted completely.

Furthermore, the pressure equalization device DAV has in the present case a filter element F which can be flowed through by air L and the first throughflow side DS1 of which is fluidically connected both to the second inflow side ES2 and to the first outflow side AS1. Furthermore, a second throughflow side DS2 of the filter element F and the brush chamber are fluidically connected to one another.

The pressure equalization device DAV, the housing G, the electric machine EM and also the motor vehicle demonstrate a respective possible way of avoiding a pressure difference between the liquid chamber K2 and the air chamber K1 of the electric machine EM, which are fluidically sealed off from one another by the radial shaft seal RWD. Current leakage problems between the chambers K1, K2 are in this way effectively countered. The extracting of air from and supplying of air to the two chambers K1, K2 (which may also be referred to as the oil space and the air space) are split. The supplying of air to the system takes place by way of the air side, that is to say by way of the air chamber K1 or by way of the backflow preventer V1 communicating fluidically with the air chamber K1. The extracting of air from the system takes place by way of the oil side, that is to say by way of the backflow preventer V3 communicating fluidically with the liquid chamber K2. The two chambers K1, K2 are fluidically connected to one another monodirectionally by the second backflow preventer V2, which can be or is flowed through when there is the absolutely low opening pressure difference of less than 1 mbar. The throughflow direction or flow direction is predetermined by the second backflow preventer V2, to be precise from the air side to the oil side. Oil is thereby prevented from being introduced into the air space or into the air chamber K1, in particular into the brush chamber BK and into the inverter chamber IK. The second backflow preventer V2 allows a fluid or air flow in the direction R2 if there is an overpressure in the air space or an underpressure in the oil space. As a result, the critical operating points of the radial shaft seal RWD are avoided as a result of the pressure equalization between the chambers K1, K2. The opening pressures or opening pressure differences of the backflow preventers V1, V2, V3, which may be designed in particular as a respective umbrella valve, to or from the outside are designed such that high system pressures are avoided, whereby the system is highly efficient.

Figure 2:
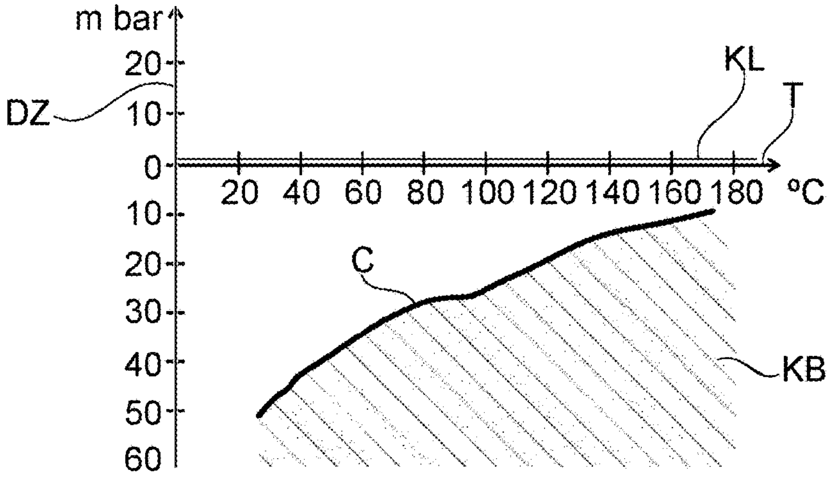
FIG. 2 shows a diagram of operating states of a radial shaft seal of the electric machine, with critical operating states being avoided by the pressure equalization device.

FIG. 2 shows by way of example a diagram of operating states of the radial shaft seal RWD of the electric machine EM, with critical operating states KB being avoided by the pressure equalization device DAV. A temperature T of the radial shaft seal RWD is characterized by the abscissa, while the ordinate characterizes a pressure difference between the chambers K1, K2. In dependence on the temperature T of the radial shaft seal RWD, the critical operating states KB are obtained in the region below the limiting curve C. The use of the pressure equalization device DAV has the effect that the operating points of the radial shaft seal RWD are always above the limiting curve C, and consequently are not critical. This is so because the pressure equalization between the chambers K1, K2 by way of the second backflow preventer V2 already takes place under a pressure difference DZ of 10 mbar, in particular as from a pressure difference DZ of 1 mbar. This is shown in the diagram of FIG. 2 by the opening characteristic KL of the second backflow preventer V2. As a result, the radial shaft seal RWD is then only subjected to non-critical operating points.

LIST OF REFERENCE SIGNS

AS1 Outflow side
AS2 Outflow side
AS3 Outflow side
B Structural unit
BK Brush chamber
C Limiting curve
DAV Pressure equalization device
DR Sealing ring
DS1 Throughflow side
DS2 Throughflow side
DZ Pressure difference
EM Electric machine
ES1 Inflow side
ES2 Inflow side
ES3 Inflow side
F Filter element
G Housing
GK Transmission chamber
I Inverter
IK Inverter chamber
K1 Air chamber
K2 Liquid chamber
KD Cable leadthrough
KV1 Combined chamber unit
KV2 Combined chamber unit
L Air
N Liquid
KL Opening characteristic
Ö1 Opening
Ö2 Opening
Ö3 Opening
P Terminal cable
R1 Flow direction
R2 Flow direction
R3 Flow direction
RW Rotor shaft
RWD Radial shaft seal
S Stator
SK Stator chamber
T Temperature
V1 Backflow preventer
V2 Backflow preventer
V3 Backflow preventer
W1 Wall
W2 Wall
W3 Wall

What is claimed is:

1. A pressure equalization device for an electric machine having a housing, the pressure equalization device comprising:

a first backflow preventer;

a second backflow preventer; and a third backflow preventer, wherein an outflow side of the first backflow preventer is fluidically connected to an inflow side of the second backflow preventer, and is also configured to be fluidically connected to an air chamber of the housing, and wherein an outflow side of the second backflow preventer is connected to an inflow side of the third backflow preventer, and is also configured to be fluidically connected to a liquid chamber of the housing, which is fluidically sealed off from the air chamber by a radial shaft seal.

2. The pressure equalization device according to claim 1, wherein the second backflow preventer is configured to allow flowing of a fluid from its inflow side to its outflow side from an opening pressure difference existing between its inflow side and its outflow side which is less than 10 millibars.

3. The pressure equalization device according to claim 1, wherein at least two of the first, second, or third backflow preventers are formed together in one structural unit.

4. The pressure equalization device according to claim 1, wherein a filter element is configured to flow through a fluid, wherein a first throughflow side of which is fluidically connected to the inflow side of the second backflow preventer, and a second throughflow side of which is also configured to be fluidically connected to the air chamber of the housing.

5. The pressure equalization device according to claim 4, wherein the outflow side of the first backflow preventer and the first throughflow side are fluidically connected to one another.

6. The pressure equalization device according to claim 1, wherein one or more of the first, second, or third backflow preventers is/are formed as a respective check valve or an umbrella valve.

7. A housing for an electric machine, comprising:

an air chamber;

a liquid chamber; and a pressure equalization device comprising:

a first backflow preventer;

a second backflow preventer; and a third backflow preventer, wherein an outflow side of the first backflow preventer is fluidically connected to an inflow side of the second backflow preventer, and is also configured to be fluidically connected to the air chamber, and wherein an outflow side of the second backflow preventer is connected to an inflow side of the third backflow preventer, and is also configured to be fluidically connected to the liquid chamber, wherein the air chamber and the liquid chamber are fluidically connected to one another by an opening, and the air chamber and the liquid chamber are fluidically sealed off from one another at the opening in response to a radial shaft seal being inserted into the opening and a shaft of the electric machine extending through the radial shaft seal.

8. The housing according to claim 7, wherein a brush chamber is formed by the air chamber and a stator chamber is formed by the liquid chamber.

9. The housing according to claim 7, wherein the air chamber is formed by a combined chamber unit which is formed by a brush chamber and a stator chamber communicating fluidically with it, with a transmission chamber being formed by the liquid chamber.

10. The housing according to claim 7, wherein a brush chamber is formed by the air chamber, with the liquid chamber being formed by another combined chamber unit, which is formed by a stator chamber and a transmission chamber communicating fluidically with it.

11. An electric machine comprising:

the housing according to claim 7.

12. A motor vehicle comprising:

the electric machine according to claim 11.

* * * * *